Oct. 15, 1946.                J. S. McGUIRE                2,409,375
            APPARATUS FOR CONTOURING THE ENDS OF TUBULAR STOCK
                  Filed May 7, 1942           2 Sheets-Sheet 2
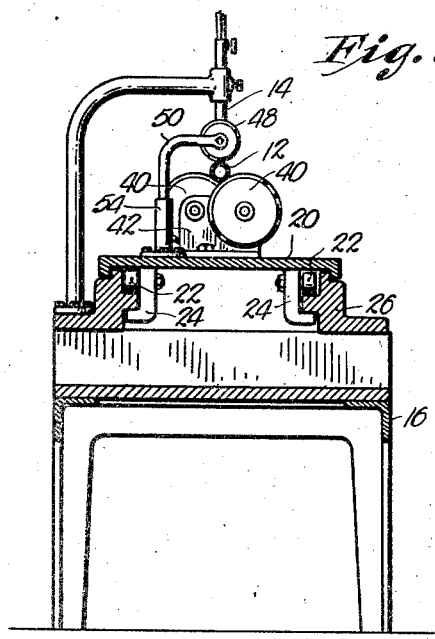
Fig. 3.
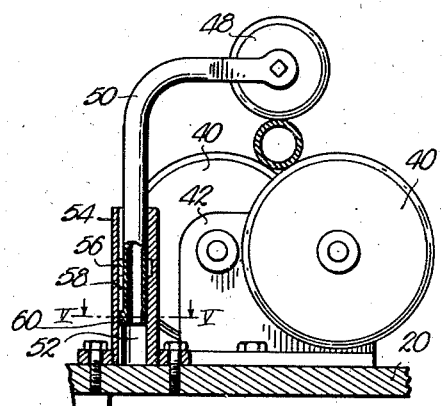
Fig. 4.
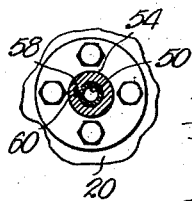
Fig. 5
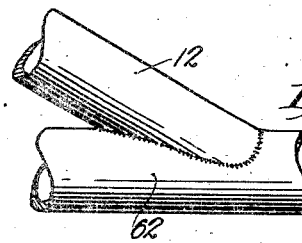
Fig. 9.
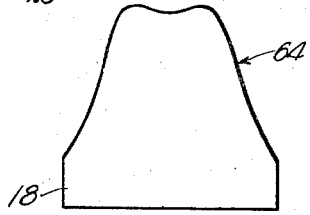
Fig. 10.
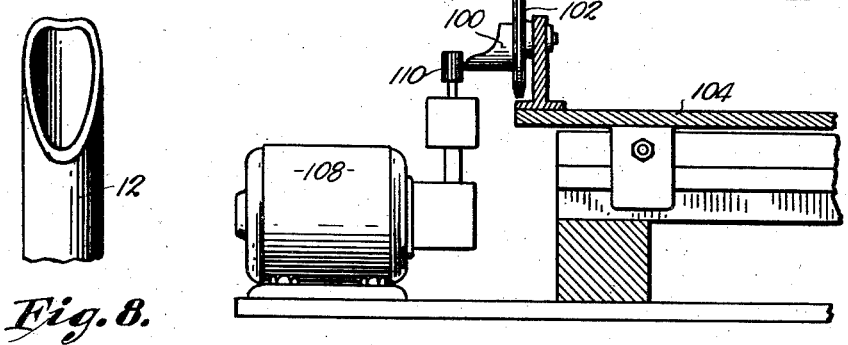
Fig. 8.        Fig. 7.
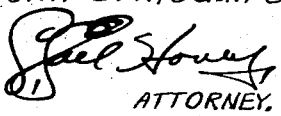
INVENTOR.
John S. McGuire
BY
ATTORNEY.

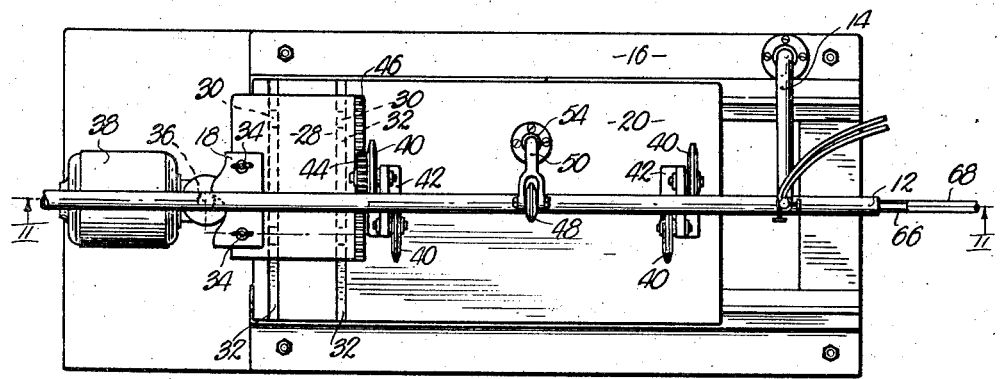
Fig. 1.
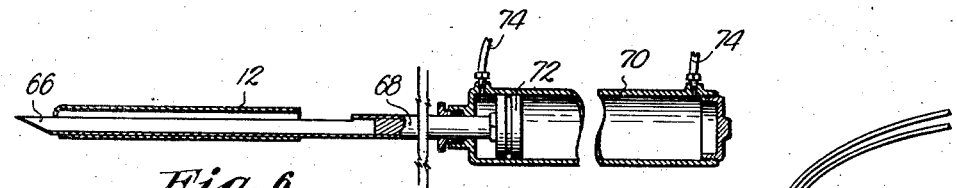
Fig. 6.
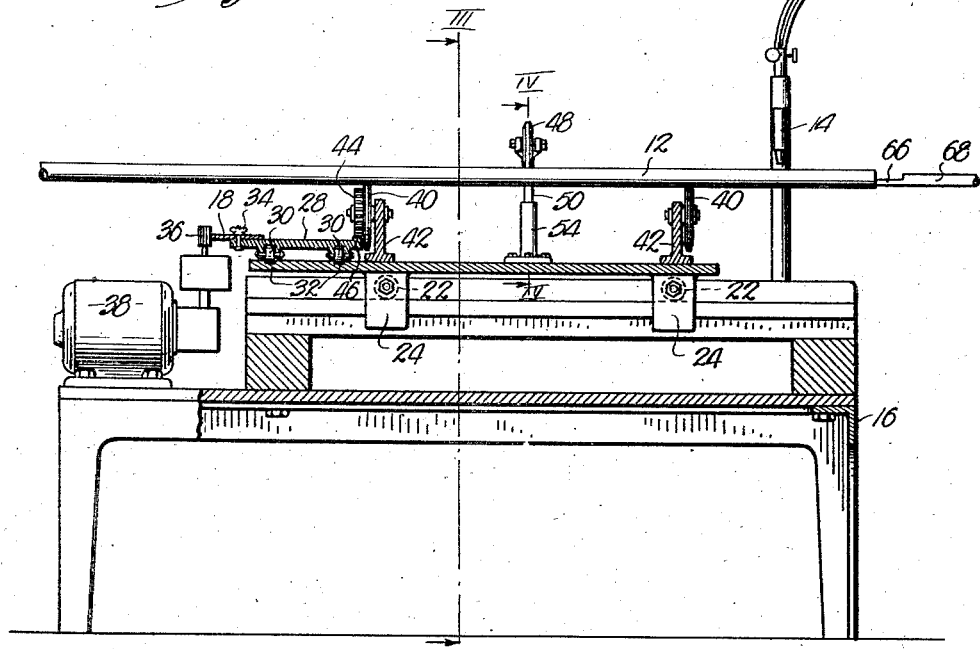
Fig. 2.

Patented Oct. 15, 1946

2,409,375

UNITED STATES PATENT OFFICE 2,409,375

APPARATUS FOR CONTOURING THE ENDS OF TUBULAR STOCK

John S. McGuire, Kansas City, Kans., assignor to C. Earl Hovey, Kansas City, Mo., as trustee Application May 7, 1942, Serial No. 442,048

1 Claim. (Cl. 33—21)

This invention relates to equipment for shaping the ends of tubular members and has for a primary object the provision of means associated with a stationary cutting torch for both rotating the tube and moving the same in a path parallel to its longitudinal axis.

This invention has for a further primary object to provide apparatus for contouring the ends of tubular stock wherein a multi-part support for the stock is included in juxtaposition with a relatively stationary cutting torch, which multi-part support has the template associated therewith whereby the transverse and longitudinal components thereof serve to control the rotary and longitudinal movement of the tube.

This application is a continuation in part of my co-pending application, Serial No. 371,367, filed December 23, 1940, and relating to substantially the same type of equipment, but wherein the torch is movable.

This invention has for its further aim to provide tube handling and forming equipment of the aforementioned character, embodying a large number of unique and novelly arranged parts incorporating minor objects of the invention, some of which will appear during the course of the following specification, referring to the accompanying drawings wherein:

Fig. 1 is a top plan view of equipment for contouring the ends of tubular stock, made in accordance with the present invention.

Fig. 2 is a longitudinal vertical central sectional view through the device illustrated in Fig. 1, taken on line II—II thereof.

Fig. 3 is a vertical cross sectional view taken on line III—III of Fig. 2.

Fig. 4 is an enlarged fragmentary detailed sectional view, taken on line IV—IV of Fig. 2.

Fig. 5 is a fragmentary sectional view taken on line V—V of Fig. 4.

Fig. 6 is a fragmentary condensed longitudinal sectional view through the slag collecting mechanism.

Fig. 7 is a sectional view through a portion of an apparatus for contouring the ends of tubes, embodying a modified form of the invention.

Fig. 8 is a side elevational view of a portion of a tube after the end thereof has been formed.

Fig. 9 is a fragmentary elevational view of the formed tube, illustrated in Fig. 8, showing the manner in which the same is attached to a companion structural member; and Fig. 10 is a view of the template employed in forming the end of the tube shown in Fig. 8 and illustrating the transverse and longitudinal components thereof.

The preferred embodiment of the invention is clearly illustrated in Figs. 1 to 4 inclusive. The tubular stock being treated is indicated by the numeral 12 and is shown in the said figures in place adjacent to a conventional cutting torch 14, rigidly mounted upon a bench or other suitable support 16.

The form which the tube 12 is to assume, after torch 14 has completely acted thereon through one cycle of operation, is controlled by the transverse and longitudinal components of template 18, operably mounted with respect to tube 12. Throughout the following specification, the transverse components of template 18 will refer to the portions of the face of said template that are disposed at substantially right angles to the length of tube 12. The longitudinal component refers to the faces of template 18 extending substantially parallel to the longitudinal axis of tube 12. The face of template 18, obviously, includes components between these two directions, but it will be understood that when angular components are encountered by the hereinafter described driving roller, a combination of both the transverse and longitudinal components will effect a movement at an angle to said two components and thereby serve to establish any desired contour at the end of tube 12 as it is moved with respect to stationary torch 14.

Apparatus for operably mounting tube 12 is carried by support 16 and in a simple form, comprises platform 20 mounted for rectilinear reciprocation upon support 16 through the medium of rollers 22 and brackets 24. These rollers travel in a tract 26 on support 16 and confine the movement of platform 20 to a path of travel parallel to the longitudinal axis of tube 12.

A table 28 carried by platform 20 is bodily movable with said platform but also relatively shiftable with respect thereto in a path of travel perpendicular to the path of travel of the platform 20. In other words, the movement of table 28 is perpendicular to the longitudinal axis of tube 12. This table 28 is carried by rollers 30 operably resting in transverse grooves 32 formed in platform 20. Template 18 is mounted on table 28 through the medium of wing nuts 34 or analogous mechanical means easily manipulated by the operator to the end that template 18 may be replaced as desired.

A magnetic roller 36 is driven by motor 38 along the contoured edge of template 18 and as components of said edge are traversed, platform 20 and table 28 will be shifted to move tube 12 longitudinally and rotate the same.

Rotation of tube 12 is effected through the manner of mounting the same upon platform 20. The apparatus employed for this purpose comprises a number of lapped, supporting discs 40 freely mounted for rotation by bearings 42. One of the discs 40 has a pinion 44 thereon that is in mesh with rack 46 on table 28. When tube 12 is resting in the valleys provided by discs 40, a pressure roller 48 exerts a downward force to establish sufficient friction between the annular flat peripheries of discs 40 and tube 12 to cause the latter to turn as the disc 40 with the pinion 44 is moved about its axis.

Pressure roller 48 is carried for free rotation on the upper end of an L-shaped arm 50, one leg of which enters socket 52 of fixture 54 secured to platform 20. Arm 50 and fixture 54 have special inter-engaging parts permitting the vertical movement of arm 50 and the holding of said arm in an elevated position to facilitate the introduction of tubing 12. An annular internal groove 56 formed in fixture 54 is crossed by a vertical furrow 58, both of which are of a size to receive radial, external ear 60 on arm 50. As arm 50 is raised, ear 60 rides along furrow 58 to groove 56 where rotation about the axis of arm 50 may occur to cause ear 60 to enter groove 56 a sufficient amount to afford support.

In the form of apparatus illustrated in Figs. 1 and 2, template 18 is planar and attached to table 28, as above described. In the modified form of the invention illustrated in Fig. 7, template 100 attached to disc 102 is arcuate but serves the same purpose when associated with platform 104 movable in a path of travel parallel to the axis of tube 106. Motor 108 having a magnetic roller 110 is of the same character as above set forth with respect to parts 38 and 36 respectively.

Tubing 12 is contoured when the ends thereof are to be brought into abutting relation with the side of a companion structural member, such as 62 illustrated in Fig. 9. The contoured or formed end of tube 12, shown in Figs. 8 and 9, was produced through the employment of template 18 having a contoured face 64 substantialy as illustrated. The transverse and longitudinal components of face 64 control like components of the face on the formed end of tube 12 because of the movement established to move tube 12 with regard to torch 14 as motor 38 drives roller 36 over the developed face of the template.

As torch 14 cuts through tube 12 at a point on the upper side thereof, the slag or waste products of the cut drop by gravity and the force of the jet, into a trough 66 extending longitudinally from piston rod 68 reciprocably carried by cylinder 70. Air or other motivating force for piston 72 is introduced and exhausted through tubes 74 and any suitable valving that may be employed.

Conventional arrangements of parts well-known in the arts may be used to move piston 72 to the position shown in Fig. 6 where trough 66 is below the point of cut in tube 12. Thus, when slag is collected in trough 66, the latter may be withdrawn and the slag discarded. Through such a device, the cutting is rendered smooth and without fluctuation due to the collection of slag and the adherence thereof to the inner face of tube 12 at a point where the jet from torch 14 is likely to be impeded.

Apparatus embodying the broad concepts of this invention may be made to present appearances vastly different from those illustrated in the drawings and from the foregoing specification it will be understood that movement of a multi-part platform upon which is mounted the tube being cut as torch 14 remains stationary, may be accomplished in many ways. It is desired, therefore, to be limited only by the spirit of the invention and scope of the appended claim.

Having thus described the invention, what is claimed as new and desired to be secured by Letters Patent is:

A machine for contouring the ends of tubular articles comprising a support; a cutting or marking tool fixed to the support; a platform mounted on the support for longitudinal rectilinear reciprocating movement; rotatable discs on the platform for supporting the tube being contoured adjacent to the cutting or marking tool, said discs having their axes of rotation parallel to the path of travel of said platform, said tube being in frictional engagement with said supporting discs for rotation therewith as one of said discs is rotated; a table carried by the platform and adapted to move transversely with respect to the support, the said platform, and the said tube; a pinion on at least one of said discs; a rack on said table parallel to the path of travel of the table in operative engagement with said pinion; a planar template removably secured to the table having a working edge contoured to present both longitudinal and transverse components; and stationary driving means engageable with the working face of the template for moving the platform through its paths of travel when the longitudinal components of the working face are engaged and for shifting the table when the transverse components of the work face of the template are engaged by the driving means, whereby the tube is rotated as the table is shifted and the tube is bodily moved with respect to the cutting or marking tool as the platform travels through its path of movement.

JOHN S. McGUIRE.